(12) United States Patent
Durham et al.

(10) Patent No.: US 11,628,650 B2
(45) Date of Patent: *Apr. 18, 2023

(54) OPEN AREA CORE SANDWICH STRUCTURE ASSEMBLY WITH VEHICLE EXTERIOR SURFACE GLASS

(71) Applicant: CONTINENTAL STRUCTURAL PLASTICS, INC., Auburn Hills, MI (US)

(72) Inventors: Patrick Durham, Auburn Hills, MI (US); Yuhei Konagai, Auburn Hills, MI (US); Yutaka Yagi, Auburn Hills, MI (US); Matthew Plauman, Auburn Hills, MI (US); Evan Freeman-Gibb, Auburn Hills, MI (US); Hugh Foran, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/299,467

(22) PCT Filed: Nov. 3, 2019

(86) PCT No.: PCT/US2019/064096
§ 371 (c)(1),
(2) Date: Jun. 3, 2021

(87) PCT Pub. No.: WO2020/117717
PCT Pub. Date: Jun. 11, 2020

(65) Prior Publication Data
US 2022/0024183 A1 Jan. 27, 2022

Related U.S. Application Data

(60) Provisional application No. 62/774,600, filed on Dec. 3, 2018.

(51) Int. Cl.
*B32B 17/04* (2006.01)
*B29C 70/18* (2006.01)
(Continued)

(52) U.S. Cl.
CPC .............. *B32B 17/04* (2013.01); *B29C 70/18* (2013.01); *B32B 3/12* (2013.01); *B32B 7/12* (2013.01);
(Continued)

(58) Field of Classification Search
CPC ........ B32B 2262/101; B32B 2262/106; B32B 2264/101; B32B 2264/104;
(Continued)

(56) References Cited

U.S. PATENT DOCUMENTS 3,862,064 A * 1/1975 Fry .................... C08L 67/06
525/49
6,761,953 B2 7/2004 Haas et al.
(Continued)

FOREIGN PATENT DOCUMENTS

CN 1426891 A 7/2003
CN 106003850 A * 10/2016 ............. B32B 27/12
(Continued)

OTHER PUBLICATIONS

Translation of DE 102016104603, Kurt Nocker, Jun. 29, 2017. (Year: 2017).*
(Continued)

*Primary Examiner* — Hai Vo
(74) *Attorney, Agent, or Firm* — MaxGoLaw PLLC

(57) ABSTRACT

A composite sandwich panel assembly including an open area core, a high gloss surface sheet, and a structural skin. The open are core defines a plurality of pores and has a first face and an opposing second face. The high gloss surface sheet is adhered to the first face of the open area core by a
(Continued)

first adhesive layer. The high gloss surface sheet has a high gloss surface. The structural skin is adhered to the second face of the open area core by a second adhesive layer. A process for forming the composite sandwich panel assembly includes positioning the high gloss surface sheet, joining the first face of the open area core to the high gloss surface sheet with a first adhesive layer intermediate therebetween, and joining the structural skin to the second face of the open area core with a second adhesive layer intermediate therebetween.

13 Claims, 4 Drawing Sheets

(51) Int. Cl.
  *B32B 3/12* (2006.01)
  *B32B 7/12* (2006.01)
  *B32B 27/12* (2006.01)
  *B32B 37/10* (2006.01)
  *B32B 37/14* (2006.01)
  *C09J 175/04* (2006.01)

(52) U.S. Cl.
  CPC .......... *B32B 27/12* (2013.01); *B32B 37/1018* (2013.01); *B32B 37/146* (2013.01); *C09J 175/04* (2013.01); *B32B 2262/101* (2013.01); *B32B 2305/024* (2013.01); *B32B 2305/18* (2013.01); *B32B 2307/102* (2013.01); *B32B 2307/3065* (2013.01); *B32B 2307/73* (2013.01); *B32B 2307/732* (2013.01); *B32B 2605/00* (2013.01)

(58) Field of Classification Search
  CPC .......... B32B 2305/024; B32B 2305/18; B32B 17/04; B32B 27/12; B32B 3/12; B32B 37/1018; B32B 37/1284; B32B 37/146; B32B 7/12; B32B 2307/102; B32B 2307/304; B32B 2307/3065; B32B 2307/406; B32B 2307/73; B32B 2307/732; B32B 2605/00; B29C 2043/189; B29C 43/10; B29C 43/18; B29C 70/18; B29D 99/0021; B29L 2031/3002; B29L 2031/60; C09J 175/04
  See application file for complete search history.

(56) References Cited

U.S. PATENT DOCUMENTS

| | | | |
|---|---|---|---|
| 2004/0041429 A1* | 3/2004 | McLaren | B62D 29/002 296/57.1 |
| 2008/0044621 A1 | 2/2008 | Strauss | |
| 2015/0130105 A1 | 5/2015 | Preisler et al. | |
| 2015/0132532 A1 | 5/2015 | Preisler et al. | |
| 2017/0203535 A1* | 7/2017 | Oleske | B32B 5/022 |
| 2017/0348951 A1* | 12/2017 | Curfman | B32B 27/10 |
| 2019/0283361 A1* | 9/2019 | Jia | B32B 27/34 |
| 2019/0389107 A1* | 12/2019 | Kiesewetter | B32B 5/024 |
| 2022/0063384 A1* | 3/2022 | Durham | B60J 7/11 |

FOREIGN PATENT DOCUMENTS

| | | | | |
|---|---|---|---|---|
| DE | 10347598 A1 | | 6/2005 | |
| DE | 102007039126 A1 | * | 2/2009 | .......... B29C 70/086 |
| DE | 102016104603 A1 | * | 6/2017 | |
| EP | 1319503 A1 | | 6/2003 | |
| EP | 1524175 A2 | | 4/2005 | |
| EP | 2965901 A1 | | 1/2016 | |
| KR | 101614003 B1 | | 4/2016 | |
| WO | 2018102420 A1 | | 6/2018 | |

OTHER PUBLICATIONS

Translation of CN 106003850, Wang et al., Oct. 12, 2016. (Year: 2016).*
Translation of DE 102007039126, Antrag, Feb. 26, 2009 (Year: 2009).*
Int'l Search Report for PCT/US2019/064096, dated Mar. 20, 2020.
Supplementary European Search Report for EP19892862, dated Jul. 6, 2022.
Office Action issued in Chinese Patent Appln. No. 201980091128.4, dated Nov. 25, 2022.

* cited by examiner

OPEN AREA CORE SANDWICH STRUCTURE ASSEMBLY WITH VEHICLE EXTERIOR SURFACE GLASS

CROSS REFERENCE TO RELATED APPLICATIONS

This application claims priority to U.S. Provisional Application No. 62/774,600 filed Dec. 3, 2018, the contents of which is incorporated herein by reference as if explicitly and fully expressed herein.

FIELD OF THE INVENTION

The present invention in general relates to composites and in particular to a composite sandwich structure assembly with an intervening open area core support matrix and surface sheets adhered to the open area core to provide at least one surface that meets vehicle exterior surface gloss standards.

BACKGROUND OF THE INVENTION

Weight savings in the automotive, transportation, and logistics based industries has been a major focus in order to make more fuel efficient vehicles both for ground and air transport. In order to achieve these weight savings, light weight composite materials have been introduced to take the place of metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for many reasons: common examples include materials which are stronger, lighter, or less expensive when compared to traditional materials. A sandwich-structured composite is a special class of composite material that is fabricated by attaching two thin but stiff skins to a lightweight but thick core. The core material is normally a low strength material, but its higher thickness provides the sandwich composite with high bending stiffness with overall low density.

While sandwich structures have previous been developed to provide strength and reduced weight, the ability to obtain a vehicle exterior quality high gloss surface has remained a challenge, regardless of whether the surface outermost layer is thermoset resin or thermoplastic. Exemplary of these efforts are U.S. Pat. Nos. 5,087,500A; 4,803,108A; 8,091,286B2; 4,369,608A; 3,553,054A; and WO2018/202473. It is conventional to either not use such structures in settings where vehicle high surface gloss is required, or resort to an additional outer layer to provide a high gloss outermost layer. Such outermost layers can be applied after structure production or through in mold coatings, both of which add to the cost and complexity of production.

Still another problem conventional to the art is that structure edges are ineffective and allow for infiltration of humidity or moisture that becomes entrained within the core and often inconsistent with finished vehicle surface requirements. With temperature extremes this entrained moisture can reduce the operational lifetime of the structure, while increasing the weight thereof. These problems of moisture infiltration are particularly pronounced in instances when the core is formed of cellulosic materials such as paper.

Thus, there exists a need for a sandwich composite structure that affords a high gloss surface without resort to additional processing after production or the addition of further outermost surface layers. There also exists a need for such sandwich composite structures with moisture resistance and well-trimmed edges.

SUMMARY

A composite sandwich panel assembly and a process for forming the same are provided. The composite sandwich panel assembly includes an open area core, a high gloss surface sheet, and a structural skin. The open are core defines a plurality of pores and has a first face and an opposing second face. The high gloss surface sheet is adhered to the first face of the open area core by a first adhesive layer. The high gloss surface sheet has a high gloss surface. The structural skin is adhered to the second face of the open area core by a second adhesive layer.

The process for forming a composite sandwich panel assembly includes positioning a high gloss surface sheet, joining a first face of an open area core to the high gloss surface sheet with a first adhesive layer intermediate therebetween, and joining a structural skin to a second face opposing the first face of the open area core with a second adhesive layer intermediate therebetween.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
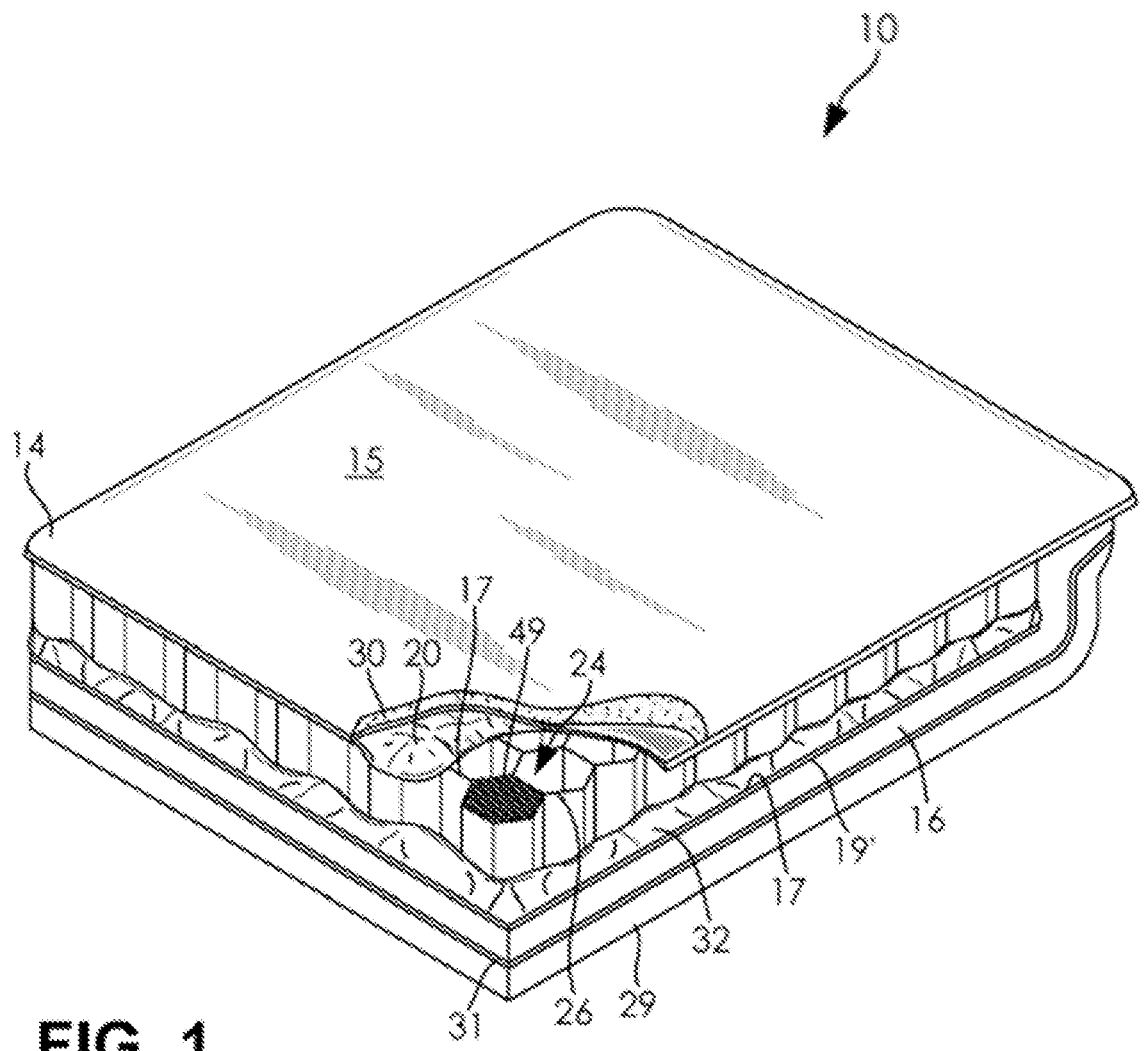
FIG. 1 is a partial cutaway, perspective view of an inventive composite sandwich assembly with a simple edge.

The present invention has utility as a composite sandwich panel structure with an open area core sandwiched between a high gloss surface sheet and a structural skin that are adhered to the open area core so as to reduce delamination of the formed part. According to embodiments of the inventive sandwich composite structure, the high gloss surface sheet and structural skin are adhered to the open area core with an adhesive or glue that is viscous when applied. The viscosity of the adhesive as applied allows for contact with the interior volume of the open area core to create more adhesion surface area yet without excessively running into the pores defined in the open area core before the adhesive cured or hardens thereby providing greater adhered contact area between the components of the inventive sandwich composite structure. As a result, reduced delamination of the components of the inventive sandwich composite structure is observed as well as precluding bond line readthrough into the high gloss surface sheet. It is appreciated that providing a high gloss exterior surface without resort to an additional outmost layer most requires a balancing of opposing surface tension properties of the inventive composite sandwich panel structures to avoid a loss in tolerances associated with bowing of the structure. In some embodiments of the present invention, a cloth is positioned intermediate between the open area core and at least one of the high gloss surface sheet or the structural skin. Embodiments of the present invention also have utility as watertight and waterproof composite sandwich panel structures.

The present invention is suitable for all vehicle components made of composite material, but in particular for vehicle body shell components, such as vehicle roof modules, roof posts, A, B, C or D pillars of vehicles, vehicle doors, wings, engine compartment covers, luggage compartment covers, rear-end modules, roof shells of cabriolet hoods, front or rear spoilers. Embodiments of the present invention further provide sound dampening and temperature variation resistance qualities.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, the term "high gloss surface" refers to a surface having minimal perceptible surface defects when visually inspected for about three seconds from about 24-28 inches from the viewer and normal to the part surface +/−90 degrees in a well-lit area. That is, the term "high gloss surface" refers to a surface capable of being painted and accepted as a "Class A" autobody part. This is commonly measured by ASTM D523. In the automotive industry, a Class A surface is a surface a consumer can see without functioning the vehicle (e.g., opening the hood or decklid), while a Class A surface finish generally refers to painted outer panels and specifically to the distinctness of image (DOI) and gloss level on the part. It is appreciated that a surface layer may be subjected to sanding, trimming, and priming prior to receiving a paint coating that imparts high gloss, yet must retain dimensionality and adhesion uniformity to primer and paint so as to achieve a high gloss finish.

Figure 2:
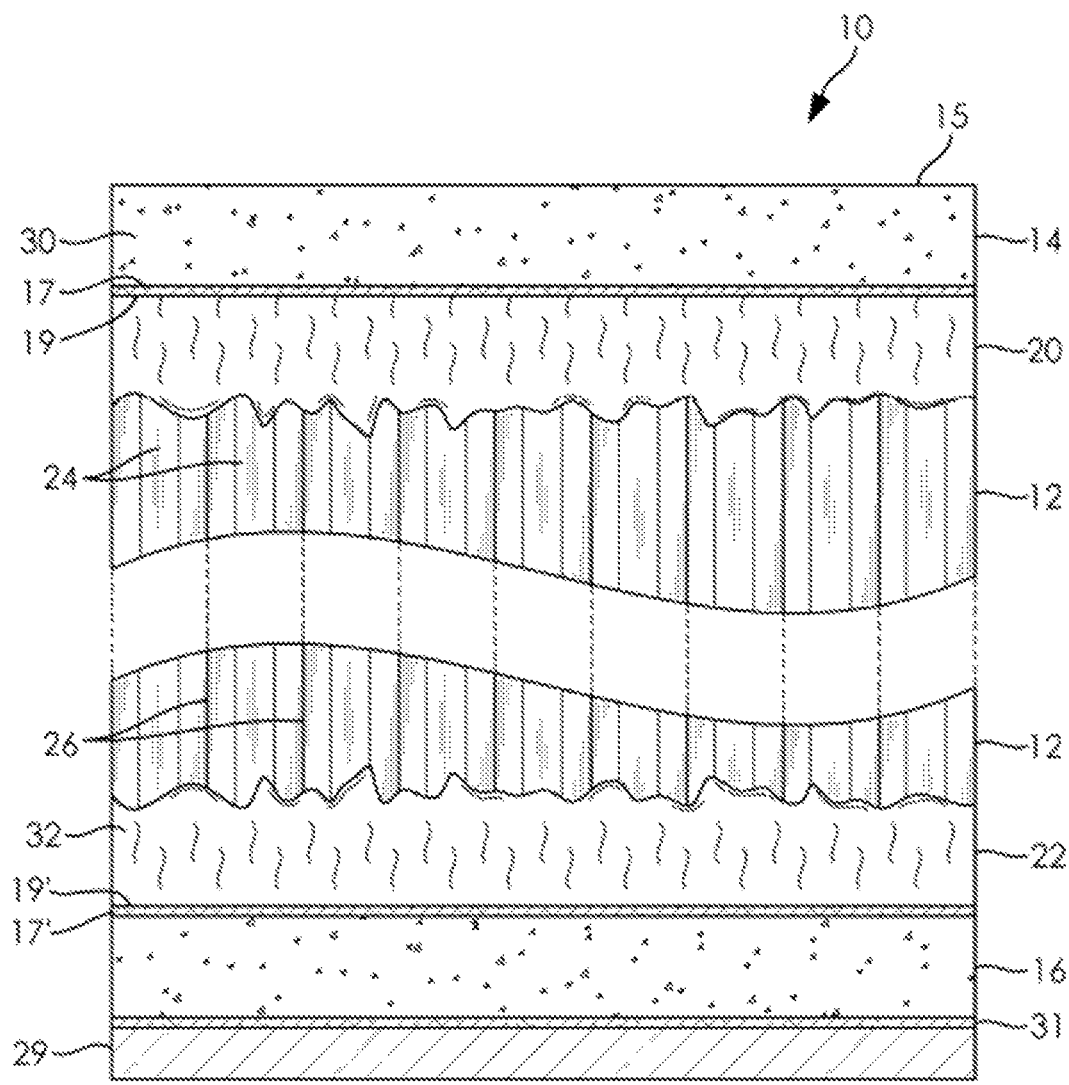
FIG. 2 is an enlarged partial cutaway, side view of a composite sandwich assembly of FIG. 1 along a line bisecting the hexagonal pores.
Figure 3A:
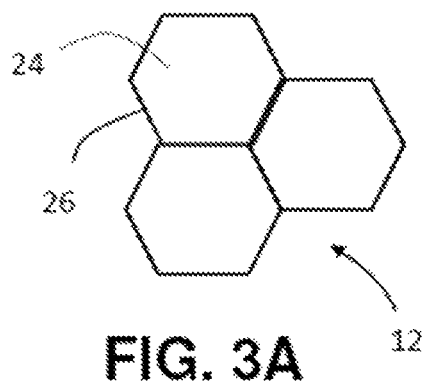
FIGS. 3A-3F are top views of various open pore structures operative in the present invention that include hexagonal (FIG. 3A), circular (FIG. 3B), rhomboidal (FIG. 3C), triangular (FIG. 3D), parallelogram quadrilateral (FIG. 3E), and regular quadrilateral (FIG. 3F)
Figure 3B:
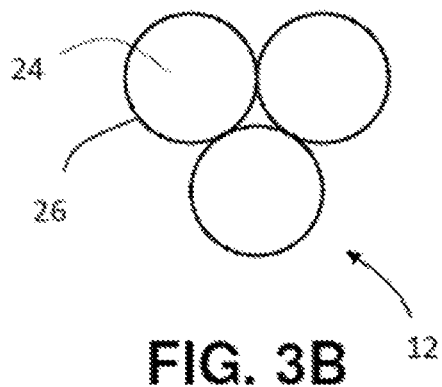
Figure 3C:
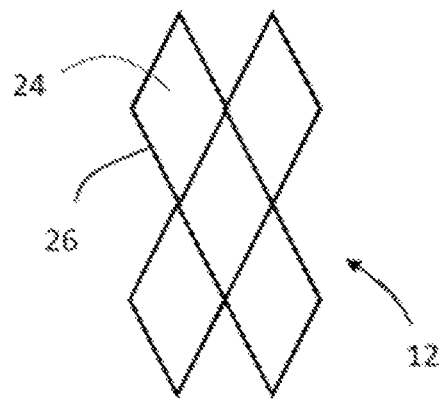
Figure 3D:
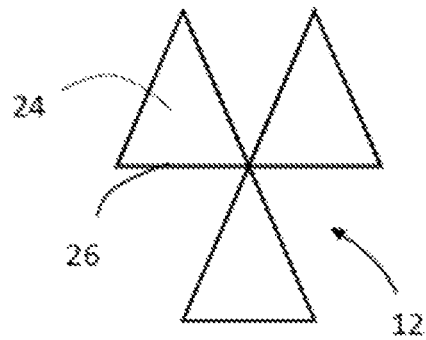
Figure 3E:
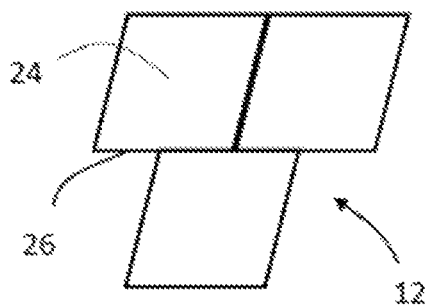
Figure 3F:
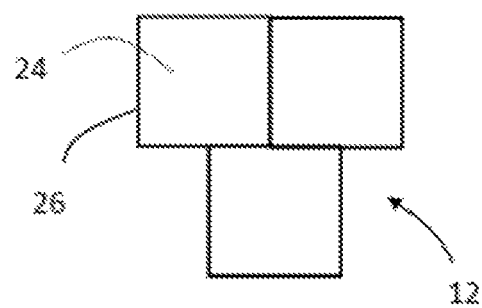

Referring now to the figures, an inventive composite sandwich, shown generally at 10. The sandwich 10 has an open area core 12 with walls 26 defining an ordered array of pores 24 terminating in faces 17 and 17'. The open area core 12 is positioned between a high gloss surface sheet 14 on one side and a structural skin 16 on an opposite side therefrom. As shown in FIG. 1, a portion of the high gloss surface sheet 14 is cutaway to reveal the adhesive 20, a cloth 19, if present; and the open area core 12. The high gloss surface sheet 14 is adhered to a first side of the open area core 12 by a first adhesive layer 20 and presents an outwardly facing high gloss surface 15. FIG. 2 is an enlarged cross-sectional view of a composite sandwich 10 according to embodiments of the invention showing further details of the various layers making up the composite sandwich. In some inventive embodiments, a cloth 19 is present intermediate between the face 17 of the open area core 12 and the high gloss surface sheet 14, the cloth 19 embedded within the adhesive 20. The structural skin 16 is adhered to an opposing second side of the open area core 12 by a second adhesive layer 22. In some inventive embodiments, a cloth 19' is present intermediate between the face 17' of open area core 12 and the structural skin 16, the cloth 19' embedded within the adhesive 22. While the structure 10 depicted in FIGS. 1 and 2 is planar, it is appreciated that both the high gloss surface and the structure surface are each independently formed with non-planar contours.

FIGS. 3A-3F show in top view of the edges of walls 26 that define pores 24 in certain embodiments of the open area core such as 12 depicted in FIGS. 1 and 2. An open area core, such as 12 depicted with respect to FIGS. 1 and 2 may use a wall material 26 to define a plurality of pores 24 in shapes that illustratively include hexagonal (FIG. 3A), circular (FIG. 3B), rhomboidal (FIG. 3C), triangular (FIG. 3D), parallelogram quadrilateral (FIG. 3E), and regular quadrilateral (FIG. 3F). of honeycombs, diamonds, squares, triangles, parallelograms, circles, or a combination thereof. The faces 17 and 17' of the open area core 12 support the tensioned high gloss surface sheet 14 and structural skin 16 when the inventive composite sandwich is assembled and transfer externally applied forces within the structure 10. It is appreciated that while pores are depicted as isolated from one another that wall structures are readily formed from extended folded strips that define a portion of several pores and when made contiguous with other such folded strips define an array of pores that are intercommunicative along the lines of contact between contiguous strips.

According to embodiments, at least some pores 24 of the open area core 12 are in fluid communication with at least one other pore 24. According to embodiments, the fluid communication is established by forming a transverse hole through a side wall 26 of at least some of the pores 24. Such holes can be formed in the material of the open area core 12 before the material is formed into the pores of the open are core. Alternatively, the holes allowing for fluid communication between the pores can be formed in the walls 26 of the core 12 after the pores 24 are formed. Fluid communication between at least some of the pores 24 ensures that air that is caught within a pore is able to move to another pore in the event that a given pore is crushed or otherwise deformed. As will be described in greater detail below, in some embodiments the edge region of the core material is crushed to form a sealed edge. In such situations, it is beneficial to provide transverse holes in the walls 26 of at least some of the pores 24, for example those near the edge to be sealed, such that when the seal is formed and the pores 24 near the edge are crushed, the air of those crushed pores is able to move into adjacent pores via the transverse holes.

An open area core, such as that depicted at 12 is formed of a lightweight material that defines a plurality of pores 24 so as to reduce the overall density of the open area core 12. An open area core according to the present invention is formed from a variety of materials that include cellulosics such as corrugated fiberboard, paper board, paper stock; thermoplastics such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer; thermosets such as polyesters, polyureas, polyurethanes, polyurea/polyurethanes, epoxies, vinyl esters; metal such as aluminum, magnesium, and alloys of any one of the aforementioned where at least one of the aforementioned metals constitutes the majority by weight of the alloy; a foam formed from polyurethane, polyethylene, ethylene vinyl acetate, polypropylene, polystyrene, polyvinyl chloride, oraerogels, regardless of whether the foam is open-celled or closed-celled.

According to some inventive embodiments, the pores 24 defined by walls 26 of the open area core 12 extend between faces 17 and 17'. In some embodiments, the walls 26 are treated to modify a property thereof such as hydrophobicity or surface energy to promote adhesion thereto. By way of example, cellulosics are prone to moisture uptake and are readily coated with a wax such as a paraffin, or a silicone to render the cellulosic more hydrophobic compared to a native state. Alternatively, the cellulosic is readily alkylated by conventional reactions such as those with chloroacetic acid. Sarymsakov, A. A et al., Chem. Nat. Compd. (1997) 33: 337. Metals are similarly coated with a primer or other corrosion inhibitor. Alternatively, metals or polymers are plasma treated to modify surface energies to facilitate adhesion thereto.

In certain inventive embodiments, the ratio of the thickness of a wall 26 to the maximal linear extent between faces 17 and 17' is between 0.01-10:1. A wall thickness ranges from 0.1 mm to 100 mm in such inventive embodiments.

A high gloss surface sheet according to the present invention and as shown for example with respect to reference numeral 14 is formed from sheet molding compound (SMC), thermoplastic, dicyclopentadiene (DCPD), overmolded polyurethane (PU), or a combination thereof. According to embodiments, the high gloss surface sheet 14 includes a filler material 30 to reinforce and/or serve to decrease the weight of the high gloss surface sheet 14. The filler material 30 is any of glass fibers, carbon fibers, natural fibers, hollow or solid glass microspheres, or a combination thereof. The fibers may be oriented or non-oriented. In some inventive embodiments in which SMC forms the high gloss surface, a resin package sold by Continental Structural Plastics, Inc. under the tradenames TCA® and TCA® ULTRA-LITE™ are used herein. Exemplary formulations of which are detailed in U.S. Pat. No. 7,700,670; WO2017/184761; and U.S. Pat. No. 7,524,547B2. It is appreciated that the high gloss sheet routinely includes additives to retain dimensionality. Such additives routinely including glass fiber; carbon fiber; inorganic particulate fillers such as calcium carbonate, talc, and carbon black; glass microspheres; carbon nanotubes; graphene; low profile additives; moisture scavengers; and combinations thereof. Typical thicknesses of the high gloss surface sheet in the present invention range from 0.5 to 5 millimeters (mm) without regard to edges.

A high gloss surface sheet such as that depicted in 14 is adhered to a first side of the open area core 12 by a first adhesive layer 20. The first adhesive layer 20 is formed of either a thermoplastic or curable formulation. According to certain inventive embodiments, the first adhesive layer 20 is a polyurethane or polyurethane prepolymer adhesive, which may be in the form of glue, a moisture cure adhesive, a reactive hot melt adhesive, or a polyurethane resin. As shown in FIG. 2, due to the compressive force applied to the first adhesive layer 20 between the high gloss surface sheet 14 and the open area core 12, the adhesive 20 is engineered to have an initial viscosity on contact with the face 17 and the walls 26 so as partially fill the pores 24 of the open area core 12. It is appreciated that the viscosity upon application is a function of factors that include application temperature, pore dimensions at the face, and intrinsic adhesive viscosity. The viscosity of the first adhesive layer 20 ensures that the adhesive does not excessively run into the pores defined in the open area core before the adhesive attains final strength. Accordingly, the adhesive surface area for adhesion between a high gloss surface sheet and an open area core is at least 5% more than surface area of the walls at the face. In still other embodiments, the adhesive area is between 5 and 100 surface area percent of the face, and even 100 surface area percent in still other inventive embodiments. This increased surface area of adhesion reduces delamination of the components of the inventive composite sandwich 10 and surprising allows for the use of thinner high gloss surface sheets that do not exhibit bond line read through. As a result of increasing the adhesive surface area coverage from 10 to 50 surface areas percent allows for the comparatively expensive high gloss surface sheet to be reduced in thickness from 1.5 mm to between 1.3 and 0.8 mm while still retaining high gloss through prevention of bond line read through.

As will be understood by a person having ordinary skill in the art, the high gloss surface sheet tends to be a comparatively dense component and an expensive portion to manufacture given the materials used and necessary forming processes to maintain minimal perceptible surface defects suitable for a Class A autobody part. To reduce costs and weight of the inventive composite sandwich panel assembly 10, it is accordingly desirable to reduce the thickness of the high gloss surface sheet 14, making it as thin as possible. It will also be understood that as the thickness of the high gloss surface sheet 14 is decreased the high gloss surface sheet 14 tends to deform when supported by limited portions of the face 17 above the open area core 12. While result to a large contact surface area of the first adhesive layer 20 is advantageous, in some inventive embodiments a cloth 19 is embedded in the first adhesive layer 20.

The cloth can be woven or nonwoven yet having sufficient porosity to allow the adhesive layer 20 to penetrate therethrough. The cloth 19 providing not only a larger surface area for adhesive layer 20, but also the cloth is believed to function to mitigate surface tension differences relative to structural layer 16 associated with situations such as the manufacturing process, temperature differences in a use environment, and differential force loading during usage. A cloth 19 operative herein illustratively includes fibers of thermoplastic materials such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer; carbon fibers; polyamides; glass fibers in the form as a woven, roving, or lofted sheet; and mixtures of the various fibers. The cloth 19 has a mesh size of 10 to 1000, that is, the mesh layer has 10 to 1000 opening per square inch. The cloth 19 tends to reduce the effects of the walls 26 on the outward appearance of the high gloss surface sheet 14.

The structural skin 16 is adhered to the second side of the open area core 12 by a second adhesive layer 22. The structural skin 16 is formed of a fiber mat, a thermoplastic sheet, or an SMC. In some embodiments the SMC is also a high gloss surface as detailed about with respect to reference numeral 14. In inventive embodiments where the structural skin 16 is a fiber mat, the fiber mat is formed of glass fibers. According to certain inventive embodiments, the fiber mat forming the structural skin includes non-oriented, non-woven fibers, unidirectional, or woven fibers. The structural skin 16 is adhered to the second side of the open area core 12 by a second adhesive layer 22. The second adhesive layer 22 having the attributes of the first adhesive layer detailed above with respect to reference numeral 20. In some inventive embodiments, the same adhesive forms both first adhesive layer 20 and second adhesive layer 22. In still other inventive embodiments, a cloth 19' is present within the second adhesive layer 22, the cloth 19' having the attributes of the cloth 19 as detailed above. In some inventive embodiments where both cloths 19 and 19' are present, the cloths 19 and 19' are formed of the same material. In still other embodiments, the cloths 19 and 19' are formed of the same material and have the same thickness. In still other embodiments, the cloths 19 and 19' are formed of the same material, have the thickness, and are adhered by the same adhesive. In still other embodiments, the surface tension on the high gloss surface sheet 14 and the structural skin 16 are within 10% of one another. In some inventive embodiments, the structural skin 16 terminates against the backside of the high gloss surface sheet 14 to encapsulate the open area core 12.

According to embodiments, the thickness of the open area core 12, the high gloss surface sheet 14, and the structural skin may vary based on design parameters and intended use of a finished component formed from a composite sandwich panel assembly 10 of the present disclosure. As noted above, the present disclosure provides a high gloss surface sheet 14 having a thickness of 0.5 to 3.5 mm. The ratio of the high gloss surface sheet 14 average thickness to the open area core 12 average thickness is 0.01-1:1, while the ratio of the structural skin 16 thickness to the open area core 12 thickness is 0.05-1:1. In a particular inventive embodiment, the high gloss surface sheet 14 has an average thickness of 1.5 to 5 mm and the open area core 12 has an average pore diameter of 6 to 25 mm. In some inventive embodiments, the open area core 12 pore diameter is as much as 42 mm. As used herein, pore diameter is defined as the average of orthogonal pore dimensions measure at a right angle to the pore axis at the interior wall edge at the face 17. By way of example, a circular pore has identical diameter in x- and y-directions relative to the pore axis.

According to some inventive embodiments, a decorative layer 29 is attached to the exposed surface 31 of the structural skin 16. In some embodiments, the decorative layer 29 is a vehicle interior surface. A decorative layer 29 illustratively includes flocking, textile, carpet, leather, textured soft-touch plastic, thermoplastic film, or a combination thereof.

According to certain inventive embodiments, the composite sandwich panel assembly provides sound damping, fire retardancy, thermal insulation, or a combination thereof by placing a sound and/or heat absorbing material within the pores 24 of the open area core 12. According to embodiments, the pores 24 of the open area core 12 are at least partially filled with a fill 49. The fill illustratively including foam pellets, fire retardant, or a phase change material. Phase change materials operative herein include waxes or an inorganic salt hydrates.

The high gloss surface sheet 14 and the structural skin 16 are joined together along an edge 33A-33D of the composite sandwich panel assembly to form a seal, as shown in FIGS. 4A-4D, respectively. In certain inventive embodiments in which all of the edges of the composite sandwich panel assembly 10 are sealed, the open area core 12 is fully enclosed and moisture is inhibited from entering the interior of the composite sandwich panel assembly 10. In some situations, depending on the intended use and location of a part formed of the composite sandwich panel assembly 10, preventing moisture from entering the interior of the composite sandwich panel assembly 10 is important given that freeze thaw cycles of moisture within the part cause expansion and potentially failure of the assembly 10. Additionally, in embodiments in which the open area core 12 is formed of a hydrophilic material such as paper, moisture within the composite sandwich panel assembly 10 would destroy the open are core 12 and cause the part to fail.

FIGS. 4A-4D show various embodiments of ways in which the high gloss surface sheet 14 and the structural skin 16 are joined together to form a sealed edge 33A-33D, respectively according to the present disclosure. In some inventive embodiments an elastomeric gasket 34 is disposed between the high gloss surface sheet 14 and the structural skin 16 at the 33C to make the edge 33C more water resistant. It is appreciated that a gasket is readily included in the other edge joinder 33A, 33B, and 33D. The gasket 35 enhances maintenance of the edge seal over a wider range of use conditions.

As will be understood by one having ordinary skill in the art, to form an edge seal between the high gloss surface sheet 14 and the structural skin 16, at least one of the high gloss surface sheet 14 and the structural skin 16 requires enough material to wrap around the edge of the composite sandwich 10. According to certain inventive embodiments, at least one of the high gloss surface sheet 14 and the structural skin 16 is provided in dimensions greater than the dimensions of the final composite part such that the material is able to wrap around the final edge composite sandwich 10. According to certain inventive embodiments, the at least one of the high gloss surface sheet 14 and the structural skin 16 is preformed such that it has edges extending generally perpendicularly from the plane of the sheet material. Notably, manufacturing of such a sealed edge finish would be excessively difficult if the surface sheet 14 or structural skin were formed out of traditional materials such as aluminum. That is, given that according to some embodiments, the structural skin 16 is formed of a glass mat reinforced polyurethane material and is pushed into the high gloss surface sheet 14 formed of SMC using the shear edge, the manufacturing process for sealing the honeycomb is easier than if the honeycomb were covered with a traditional material such as aluminum.

Figure 4A:
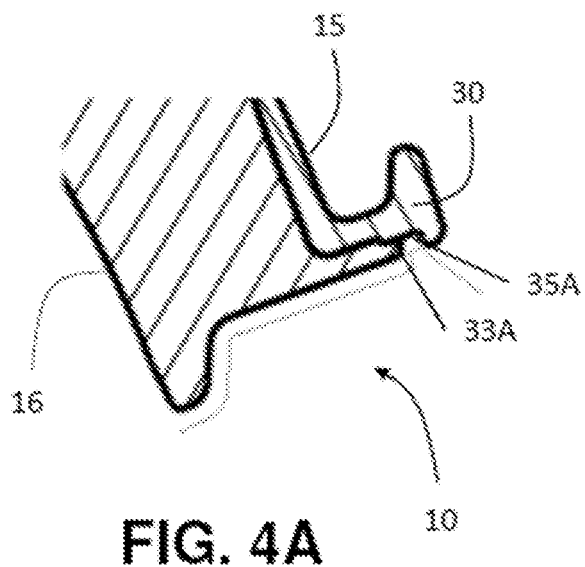
FIGS. 4A-4D are cross-sectional views of edges according to the present invention.
Figure 4B:
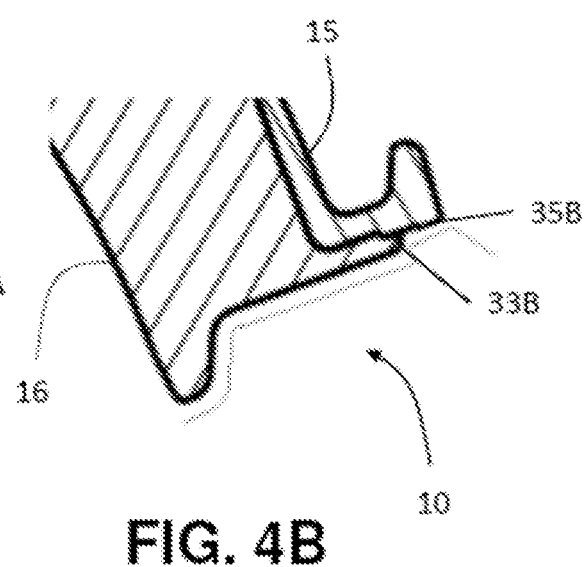
Figure 4C:
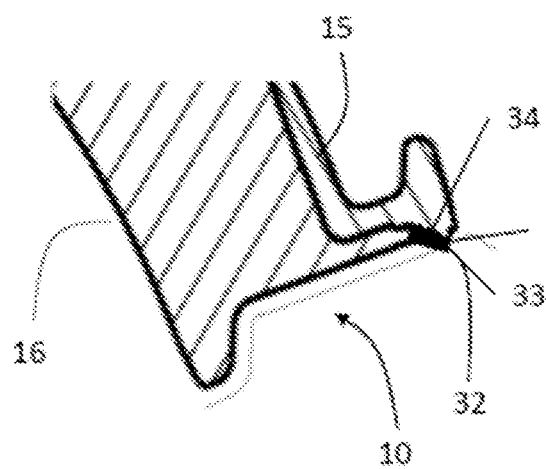
Figure 4D:
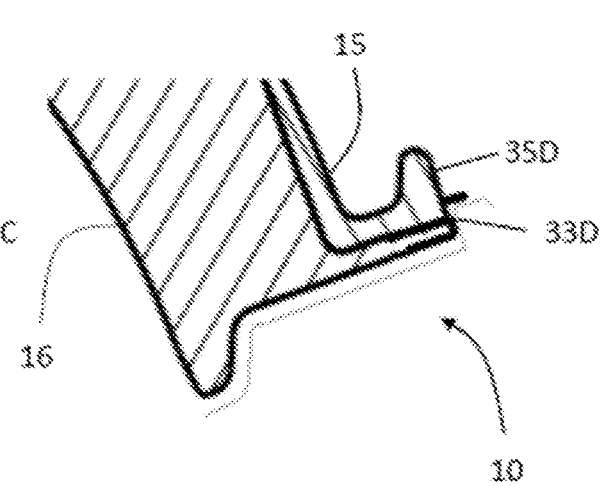

According to certain inventive embodiments, excess material is cut from the composite sandwich once the edge seal is formed. As shown in FIG. 4A, excess material of the structural skin 16 has been trimmed from the composite sandwich assembly 10 by a knife or router that presses against the divot 35A that is formed by the high gloss surface sheet 14. In FIG. 4B, the edge 33B formed by removing excess material for tool engagement against a shoulder 35B of the high gloss surface sheet 14. In FIG. 4C, the edge 33C formed by removing excess material for tool engagement against a shoulder 35C of the high gloss surface sheet 14. Also, as shown in FIG. 4D, excess material of one or both the high gloss surface sheet 14 and the structural skin 16 are trimmed with tool pressure against shoulder 35D. It is also noted that the edge region of the open area core 12 often crushes during a press molding to form the edge seal. The crushing of the pores 24 of the open are core 12 near the edge that is crushed in order to form a seal also contribute to moisture absorption inside the open area core. That is, the crushed region of the open are core aids in suppressing moisture absorption of the open are core.

The present disclosure further provides a process for forming the composite sandwich structure 10 according to embodiments of the invention. A process for forming a composite sandwich panel assembly 10 according to the present invention includes positioning a high gloss surface sheet 14 in a fixture. In some inventive embodiments, a first adhesive layer 20 is applied to a reverse side of the high gloss surface sheet 14 relative to the high gloss surface 15.

Applying the first adhesive layer 20 on to the reverse side of the high gloss surface 14 is accomplished by spraying or painting an adhesive onto the first side of the high gloss surface sheet 14.

In combination with, or instead of applying the first adhesive layer 20 on to the reverse side of the high gloss surface sheet 14, the first adhesive layer 20 is applied to the face 17. In those embodiments containing a cloth 19, the cloth is either placed onto the face 17 before an adhesive application, after adhesive application, or intermediate between initial and overcoating layers of adhesive. Regardless of the process, a cloth 19 is embedded within the first adhesive layer 20. The face 17 of the open area core 12 and the reverse side of the high gloss surface sheet are then brought into contact with at least one layer of the first adhesive layer 20 therebetween and in some instances, the cloth 19 therein on the first adhesive layer 20. Preferably, any treatment of the open area core 12 to modify hydrophobicity or surface energy has occurred prior to application of the first adhesive layer 20 thereto. If a sound The inventive process continues by applying a second adhesive layer 22 to a structural skin 16 and positioning the structural skin 16 on a second side of the open area core 12. According to embodiments, the structural skin 16 is formed of any one of sheet molding compound (SMC), thermoplastic sheet, Dicyclopentadiene (DCPD), overmolded polyurethane (PU), or a glass fiber mat. In embodiments in which the structural skin 16 is formed of a glass fiber mat, application of the second adhesive layer 22 onto the structural skin 16 occurs after the structural skin 16 is positioned on the second side of the open area core 12. Accordingly, the glass fiber mat structural sheet 16 may be impregnated with the second adhesive layer 22. According to embodiments, the second adhesive layer 22 is applied to the structural skin 16 by spraying or painting an adhesive onto the second sheet 16.

As described above, the first adhesive layer 20 and the second adhesive layer 22 include an adhesive that is highly viscous when in an uncured state. According to embodiments, the adhesive is a polyurethane or polyurethane prepolymer. According to embodiments, the composite sandwich panel 10 is baked or has heat applied to it to cure the first adhesive layer 20 and said second adhesive layer 22. In those inventive embodiments inclusive of sound, fire, of heat barrier materials, such materials are typically added to the pores 24 prior to joining the open area core 12 to the structural skin 16.

The structural skin 16 is added to the face 17' of the open area core 12 as detailed above with respect to the high gloss surface sheet with the proviso that a second adhesive layer 22 is used instead of the first adhesive layer 20 and a cloth 19' is optionally embedded therein.

According to some inventive embodiments, the process for forming the composite sandwich structure 10 further includes applying a decorative layer 29 to surface 31 of the structural skin 16. In some embodiments, the decorative layer 29 is a vehicle interior surface. It is appreciated that the relative ordering of joinder between the high gloss surface sheet 14 and the structural skin 16 can be reversed relative to that detailed above, and in still other embodiments, both the high gloss surface sheet 14 and the structural skin 16 are simultaneously joined to the open area core 12. It is further appreciated that the high gloss surface sheet 14 and the structural skin 16 are each independently positioned with outward surface 15 and 31 respectively, positions above, below, or laterally displaced relative to the open area core 12 during joinder.

According to embodiments, the inventive process further comprises at least one of compression molding or vacuum molding the composite sandwich panel 10 once the first sheet 14, open area core 12, second sheet 16, and adhesive layer 20, 22 have been assembled together. Such compression molding and/or vacuum molding forms the composite sandwich panel 10 to a component suitable to use as a vehicle component. According to embodiments, the compression molding and/or vacuum molding steps bring the edges of the high gloss surface sheet 14 and the structural skin 16 together along at least one edge of the composite sandwich panel assembly 10 to form a seal along the edge. According to embodiments, at least one of the high gloss surface sheets 14 and the structural skin 16 is preformed such that it has edges extending generally perpendicularly from the plane of the sheet material, this edge providing sufficient material such that the edges of the high gloss surface sheet 14 and the structural skin 16 can be joined together.

Excess material is removed from the edges after the seal is formed between the high gloss surface sheet 14 and the structural skin 16 with resort to a trimming tool conventional to the art.

The foregoing description is illustrative of particular embodiments of the invention but is not meant to be a limitation upon the practice thereof. The following claims, including all equivalents thereof, are intended to define the scope of the invention.

The invention claimed is:

1. A composite sandwich panel assembly, said assembly comprising:
   an open area core having a first face and a second face opposing the first face, said open are core having a plurality of walls that extend from the first face to the second face and define an ordered array of a plurality of pores;
   a high gloss surface sheet adhered to the first face of said open area core by a first adhesive layer that partially fills the plurality of pores, the high gloss surface sheet formed of a sheet molding compound (SMC) comprising glass fiber reinforced thermosetting polyester, said high gloss surface sheet having a high gloss surface; and
   a structural skin adhered to the second face of said open area core by a second adhesive layer, said structural skin formed of a glass fiber mat which is impregnated with the second adhesive layer;
   wherein a decorated layer is provided on a surface of the structural skin opposite the second adhesive layer;
   wherein a cloth of woven or non-woven fibers is embedded in the first adhesive layer and the second adhesive layer;
   wherein the first adhesive layer and the second adhesive layer each comprise a moisture cure adhesive; and
   wherein said high gloss surface sheet and said structural skin are joined together at their peripheries to form an edge defining a moisture resistant seal and wherein a plurality of pores near the moisture resistant seal are crushed such that said open area core is fully enclosed and moisture is inhibited from entering the interior of the composite sandwich panel assembly.

2. The assembly of claim 1 wherein said high gloss surface sheet has a thickness of from 0.5 to 3.5 mm.

3. The assembly of claim 1 having a ratio of a thickness of said high gloss surface sheet to a thickness of said open area core of 0.01-1:1.

4. The assembly of claim 1 wherein said high gloss surface sheet has a thickness of less than 1.5 mm and still retains the high gloss surface.

5. The assembly of claim 1 further comprising a fill in the pores of said open area core, said fill being at least one of a sound dampening foam, a fire retardant, or a phase change material.

6. The assembly of claim 1 further comprising a gasket disposed between said high gloss surface sheet and said first structural skin at said edge.

7. The assembly of claim 1 wherein said high gloss surface sheet has an average thickness of from 1.5 to 5 mm and said open area core has a pore diameter of 6 to 25 mm.

8. A process for forming a composite sandwich panel assembly, said process comprising:

positioning a high gloss surface sheet formed of a sheet molding compound (SMC) comprising glass fiber reinforced thermosetting polyester, said high gloss surface sheet having a high gloss surface;

joining a first face of an open area core to said high gloss surface sheet with a first moisture cure adhesive layer intermediate therebetween, said open are core having a plurality of walls that extend from the first face to a second face and define an ordered array of a plurality of pores wherein the plurality of pores are partially filled with the first moisture cure adhesive;

embedding a first woven or non-woven cloth in said first moisture cure adhesive layer;

joining a structural skin to the second face opposing the first face of said open area core with a second moisture cure adhesive layer intermediate therebetween, said structural skin formed of a glass fiber mat which is impregnated with the second moisture cure adhesive layer, said structural skin having a decorated layer provided on a surface thereof that is opposite said second moisture cure adhesive layer;

embedding a second woven or non-woven cloth in said second moisture cure adhesive layer; and joining said high gloss surface sheet and said structural skin at their peripheries to form an edge defining a moisture resistant seal;

wherein a plurality of pores near the moisture resistant seal are crushed such that said open area core is fully enclosed and moisture is inhibited from entering the interior of said composite sandwich panel assembly.

9. The process of claim 8 further comprising vacuum molding said composite sandwich panel assembly.

10. The process of claim 8 further comprising at least partially filling pores of said open area core with at least one of a sound dampening foam, a fire retardant, or a phase change material.

11. The process of claim 8 further comprising inserting a gasket into said edge.

12. The process of claim 8 further comprising removing excess material from said structural skin proximal to said edge.

13. The process of claim 8 further comprising applying a hydrophobic coating to said open area core.

* * * * *